(12) United States Patent
Ukita

(10) Patent No.: US 6,665,369 B2
(45) Date of Patent: Dec. 16, 2003

(54) METHOD FOR IMAGE RECONSTRUCTION, SOFTWARE FOR IMAGE RECONSTRUCTION, A RECORDING MEDIUM THEREFOR, AND A RADIOGRAPHIC APPARATUS

(75) Inventor: Masaaki Ukita, Kyoto (JP)

(73) Assignee: Shimadzu Corporation, Kyoto (JP)

( * ) Notice: Subject to any disclaimer, the term of this patent is extended or adjusted under 35 U.S.C. 154(b) by 0 days.

(21) Appl. No.: 10/180,485

(22) Filed: Jun. 27, 2002

(65) Prior Publication Data

US 2003/0016791 A1 Jan. 23, 2003

(30) Foreign Application Priority Data

Jul. 13, 2001 (JP) .......................... 2001-213297

(51) Int. Cl.[7] .............................. A61B 6/03
(52) U.S. Cl. .......................... 378/4; 378/901
(58) Field of Search .................. 378/4, 8, 19, 901

(56) References Cited

U.S. PATENT DOCUMENTS 5,062,086 A * 10/1991 Harlan et al. .................. 367/38
5,861,627 A * 1/1999 Basko et al. ............ 250/363.04

OTHER PUBLICATIONS

Intel Architecture Optimization (Reference Manual); Copyright 1998, 1999 Intel Corporation; pp. 3–26 thru 3–29.

* cited by examiner

Primary Examiner—David V. Bruce
(74) Attorney, Agent, or Firm—Rader, Fishman & Grauer PLLC

(57) ABSTRACT

An X-ray tube (X-ray focus) and an X-ray detector opposed to each other across an object synchronously scan the object to acquire radiographic data in each scan position. The radiographic data or data resulting from a filtering process of the radiographic data is projected back to a two-dimensional or three-dimensional reconstruction area virtually set to a region of interest of the object. Reconstruction software is used for causing a computer to perform reconstruction computations for each unit area (block) formed by dividing the reconstruction area. The reconstruction computations are performed successively for one unit area (block) after another in a way optimal to cache size. Data in cache memory are reused at an increased rate, and access to data in memory is reduced to shorten a time consumed by the reconstruction computations.

20 Claims, 10 Drawing Sheets

```
for(p=0;p<Np;p++) {
    for(y=0;y<Ny;y++) {
    for(x=0;x<Nx;x++) {
        u=INT(t(x,y,p));
        a=t(x,y,p)-u;
        b[y][x]=b[y][x]+(1.0-a)*s[p][u]+a*s[p][u+1];
    }}
}
```

```
By=Bx=2;
for(p=0;p<Np;p++) {
    for(yb=0;yb<Ny;yb+=By) {
    for(xb=0;xb<Nx;xb+=Bx) {
        for(y=yb;y<(yb+By);y++) {
        for(x=xb;x<(xb+Bx);x++) {
            u=INT(t(x,y,p));
            a=t(x,y,p)-u;
            b[y][x]=b[y][x]+(1.0-a)*s[p][u]+a*s[p][u+1];
        }}
    }}
}
```

```
BB=2;
for(p=0;p<Np;p++) {
    if((p<Np/8)||((Np*3/8<p)&&(p<Np*5/8)||(Np*7/8<p))) {
        B=2; B=BB*Bx;      ……(C)
    }else{
        B=2; B=BB*By;      ……(D)
    }
    for(yb=0;yb<Ny;yb+=By) {
    for(xb=0;xb<Nx;xb+=Bx) {
        for(y=yb;y<(yb+By);y++) {
        for(x=xb;x<(xb+Bx);x++) {
            u=INT(t(x,y,p));
            a=t(x,y,p)-u;
            b[y][x]=b[y][x]+(1.0-a)*s[p][u]+a*s[p][u+1];
        }}
    }}
}
```

METHOD FOR IMAGE RECONSTRUCTION, SOFTWARE FOR IMAGE RECONSTRUCTION, A RECORDING MEDIUM THEREFOR, AND A RADIOGRAPHIC APPARATUS

BACKGROUND OF THE INVENTION

1. Field of the Invention

This invention relates to reconstruction software for causing a computer to perform back projection computations for projecting radiographic data of each scan position back to a reconstruction area, a recording medium storing the software, and various tomography apparatus for use in the medical, industrial and other fields for radiographing patients or objects under examination and reconstructing sectional images thereof. More particularly, the invention relates to a method for speeding up back projection computations (main part of reconstruction computations) on radiographic data or filtered radiographic data.

2. Description of the Related Art

FIG. 1 schematically shows a X-ray tomography apparatus. The apparatus includes an X-ray tube X-ray focus f) and an X-ray detector 42 opposed to each other across an object or patient. The X-ray tube and X-ray detector 42 are rotatable synchronously about the patient's body axis to radiograph the patient intermittently from varied angles of X-ray emission from the X-ray tube to the patient. Radiographic data acquired in each scan position is put to an FBP (Filtered Back Projection) to reconstruct images of a region of interest of the patient. The FBP is a method in which radiographic data for a plurality of images of the patient acquired from different angles is put to a filtering correction process to produce data S which is projected back to a reconstruction area B virtually set to the region of interest of the patient.

To determine a reconstruction pixel value of point $b(x, y)$ in the two-dimensional reconstructing area B, for example, value s ($t(x, y, p)$) of detecting coordinates $t(x, y, p)$ corresponding to a pth projection from point $b(x, y)$, is added up the number of times of projection (Np times). This is expressed by equation (1) below and the value s is one of S. Here, t is usually calculated complicatedly from various positional information such as an X-ray focus position, a detector position and a scan angle. However, the representation $t(x, y, p$ causes no problem since a scanning orbit is usually fixed and scan angle is calculated from p.

$$b(x, y) = \sum_{p=0}^{N_p-1} s(t(x, y, p)) \quad (1)$$

In the above equation (1), usually t is not an integer and array value s ($t(x, y, p)$) cannot be determined directly. Therefore, an interpolating calculation is carried out using two adjacent points as shown in FIG. 2. This is expressed by the following equation (2):

$$b(x, y) = \sum_{p=0}^{N_p-1} \{(1-a) \times s(u) + a \times s(u+1)\} \quad (2)$$

When a computer performs an integrating operation as expressed by the above equation (2), a computation as expressed by the following equation (3) is carried out the number of times of projection (Np times):

$$b(x, y) = b(x, y) + (1-a) \times s(u) + a \times s(u+1) \quad (3)$$

FIG. 3 shows a conventional example of program code relating to the above equation (3). In u=INT ($t(x, y, p)$) and $a=t(x, y, p)-u$, function $t(x, y, p)$ is a function for calculating original data coordinates for back projection by floating point. Function INT ( ) is a function for rounding down to make an integer. Such reconstruction computations are extremely time-consuming, and usually a dedicated DSP board or the like is used for the computations. However, with personal computers (hereinafter abbreviated "PC" as appropriate) with ever-increasing high-speed features, radiographic apparatus have been developed with PCs for performing such reconstructing computations.

A PC today is made up of a CPU (central processing unit), memory, a hard disk (HD), IOs (input/output ports) and peripherals such as a keyboard and a mouse. Usually software and data are stored on the hard disk, which are loaded into the memory and processed by the CPU. The latest CPU chip operates faster than the memory. To demonstrate this high-speed capability, improvement has been made in performance by introducing a high-speed memory called cache memory between the CPU and memory. The cache memory is often mounted on the same semiconductor chip on which the CPU is mounted. The term CPU often embraces the cache memory. However, since high speed is required, the cache memory is more expensive than the main memory, and its storage capacity is usually small. Operation of this cache memory will be described now. When a necessary program or data is not present in the cache memory, the CPU automatically loads the program or data from the memory to the cache memory. Meanwhile, the CPU can perform a different task, thereby increasing overall efficiency. When the cache memory is full, unused old data is successively written into the memory, or data not overwritten is simply discarded. In this way, the cache memory is constantly filled with latest data needed by the CPU.

A relatively high performance PC today may have a 20 GB hard disk, a 1 GB memory, a 400 MHz CPU, and a 512 KB cache memory. In such a PC, read and write performance between CPU and cache memory is about 3200 MB/sec, and read and write performance between cache memory and memory is about 800 MB/sec. In a transfer time of 4 byte floating point data, the read and write time between CPU and cache memory is 1.25 nsec/float, and read and write time between cache memory and memory is 5 nsec/float. Thus, the cache memory is about four times as fast.

A simplified example of caching operation will be described based on an addition of all pixels in image data (1 Mbytes) of 512×512 pixels with floating point values (4 bytes). The image data is too large to store in the above 512 Kbyte cache memory. The CPU adds up the pixels while the first half of the image data in 512 Kbytes is loaded into the cache memory at 512 kbytes/800 Mbytes =640 μsec. However, the data is transferred between the cache memory and CPU at a fast rate of 512 kbytes/3200 Mbytes=160 μsec. Thus, the CPU just waits for the data for 640−160=480 μsec. and stands idle without adding pixels. Next, when the CPU requests the second half of the image data in 512 Kbytes, the cache memory data is replaced successively from old data, and after 512 kbytes/800 Mbytes=640 μsec, the cache memory has the second half of the image data in 512 Kbytes. However, the CPU remains idle for 480 μsec. as above.

The prior art has the following drawback. The latest PCs incorporate improvement such as cache memory regarding memory accessing. However, as shown in FIG. 3, only computations "for the direction along x-axis, and then for the direction along y-axis" are performed for the back projection computations. This fails to make good use of the computing capability of the CPU. A long time is taken in reconstruction computations as described below. Two-dimensional and three-dimensional reconstructions will particularly be described hereinafter.

The number of times of and a time taken in data reading and writing needed for computations to reconstruct a two-dimensional sectional image will be described first.

The foregoing equation (3) is used to determine the number of memory accesses needed to compute a section reconstruction for one point for one back projection. Value b(x, y) of point (x, y) in the section reconstructing area B is read once, then added and written. Thus, memory access occurs twice. For radiographic data S after a filtering correction, two data are read for interpolation, and thus memory access occurs twice. This requires memory access to be made a total of four times (2+2=4).

Next, for one back projection to the reconstruction area B of the size Nx×Ny, memory access is required Nx×Ny×4 times. Further, when the back projection is made Np times, memory access is required Nx×Ny×4×Np times in total. Usually, data is represented by 4 byte floating point numbers for computations. The number of memory accesses required is Nx×Ny×4×Np×4 bytes.

A memory access time for the two-dimensional reconstruction will be described with reference to a relatively high performance PC as noted hereinbefore. when, for example, the back projection is made Np=1800 times to the reconstructing area B of Nx=512 and Ny=512, memory access will be Nx×Ny×4×Np×4 bytes=7,549,747,200 bytes. It will be seen that, since the memory transfer rate is 800 Mbyte/sec., a time as long as 9.437 sec. is required. However, since the data transfer time between cache memory and CPU is four times faster, the CPU waits for data for 75% of the 9.437 sec., which constitutes an idle time without computations being performed, hence a serious waste.

The number of times of and a time taken in data reading and writing needed for computations to reconstruct a three-dimensional image will be described based on a concept similar to the above. Assume that the foregoing equation (3) remains substantially the same, and that an interpolation is carried out based on four adjacent points. For a calculation of one point, value b(x, y, z) of point (x, y, z) in the reconstruction area is read once, then added and written. Thus, memory access has to be made twice. For radiographic data S after a filtering correction, four points are read for interpolation, and thus original data are read four times, requiring memory access four times. This requires memory access to be made a total of six times (2+4=6).

Next, for one back projection to the section reconstruction area of the size Nx×Ny×Nz, memory access is required Nx×Ny×Nz×6 times. Further, when the back projection is made Np times, memory access is required Nx×Ny×Nz×6×Np times in total. Usually, data is represented by 4 byte floating point numbers for computations. The number of memory accesses required is Nx×Ny×Nz×6×Np×4 bytes.

A memory access time for the three-dimensional reconstruction will be described with reference to the relatively high performance PC noted above. When, for example, the back projection is made Np=512 times to the reconstructing area of Nx=512, Ny=512 and Nz=512, memory access will be Nx×Ny×Nz×6×Np×4 bytes=1,649,267,441,664 bytes. It will be seen that, where the memory transfer rate is 800 Mbyte/sec., a time as long as 2061.5843 sec. is required. However, since the data transfer time between cache memory and CPU is four times faster, the CPU waits for data for 75% of the 2061.5843 sec., which constitutes an idle time without computations being performed, hence a serious waste.

SUMMARY OF THE INVENTION

This invention has been made having regard to the state of the art noted above, and its object is to provide reconstruction software, a recording medium therefor and a radiographic apparatus for speeding up reconstruction computations.

To fulfill the above object, Inventor has made intensive research and attained the following findings. Though back projection computations (main part of the reconstruction computations) are a simple integrating operation, the computations are characterized by frequent reading and writing of data from/to the same data area, thus requiring a great number of memory accesses to be made. Based on this feature, the order of reconstruction computations is changed, that is the order of accessing data is changed to an optimal order by taking cache size into account. This has been found to allow the data in cache memory to be reused at an increased rate, and to decrease the number and time of data accesses between CPU and memory, thereby to shorten a time consumed by the section reconstructing computations.

Based on such findings, this invention provides reconstruction software for performing back projection computations to project radiographic data of an object acquired in each scan position back to a reconstruction area. The software comprising the step of causing the back projection computations to be performed, for each unit area formed by dividing the reconstruction area, for projecting the radiographic data acquired in each scan position, or data resulting from filtering of the radiographic data, back to a two-dimensional or three-dimensional reconstruction area virtually set to a region of interest of the object. The radiographic data being acquired by causing a radiation source and a detector arranged opposite each other across the object to scan the object synchronously, or to scan the object synchronously with rotation of the object, the radiation source irradiating the object with electromagnetic waves capable of penetrating the object, the detector detecting electromagnetic waves transmitted through the object.

According to this invention, the radiation source irradiates an object with electromagnetic waves capable of penetrating the object, and the detector is disposed opposite the radiation source for detecting electromagnetic waves transmitted through the object. The radiation source and detector are operable to scan the object synchronously, or to scan the object synchronously with rotation of the object, to acquire radiographic data in each scan position. The reconstruction software used causes back projection computations to be performed, for each unit area formed by dividing a section reconstructing area, for projecting the radiographic data, or data resulting from filtering of the radiographic data, back to a two-dimensional or three-dimensional reconstruction area virtually set to a region of interest of the object. Thus, the back projection computations (reconstruction computations) may be performed for each unit area, that is successively for one unit area after another in a way optimal to cache size. The data in the cache memory are reused at an increased rate, and access to data in the memory is reduced to shorten a total data transfer time and a time consumed by the reconstruction computations, thereby performing the section reconstruction computations at high speed.

Preferably, each unit area has a square, rectangular, triangular, lozenge-shaped, trapezoidal or other polygonal shape where the reconstruction area is two-dimensional, and a cubic, rectangular parallelepiped, trigonal pyramid, circular cone or other solid shape where the reconstruction area is three-dimensional. In this way, each unit area may have a shape appropriately set in view of cache size.

Preferably, each unit area is varied in orientation to be long in a direction of back projection. Then, for most directions of back projection, the data in the cache memory are reused at a fixed rate, and a reduced time is consumed by the reconstruction computations.

Preferably, the back projection computations are performed for each unit area successively in respect of radiographic data corresponding to a plurality of positions among all scan positions. In this way, the part corresponding to each unit area of a plurality of radiographic data are projected back to the unit area in the reconstruction area. This allows the data in the cache memory to be reused at a further increased rate, and further shortens the time consumed by the reconstruction computations.

Preferably, the unit areas have different sizes between central parts and peripheral parts of the reconstruction area. This will suppress variations in the time taken by the back projection computations due to great increases in necessary cache memory size occurring with positions of the unit areas in the reconstruction area. Thus, the reconstruction time may be shortened substantially fixedly irrespective of the positions of the unit areas.

Preferably, the data are successively projected back first to one unit area and then to an adjacent unit area. This allows the data in the cache memory to be reused at a further increased rate, and shortens the time consumed by the reconstruction computations.

Preferably, the data are projected back to a plurality of back projection points in the unit area, first to one back projection point and then to an adjacent back projection point. Thus, the section reconstructing computations are performed in an appropriate order to secure the rate of reusing the data in the cache memory, and shorten the time consumed by the section reconstructing computations.

Preferably, the radiographic data after a filtering process is projected, without interpolation, back to the unit areas. Then, data for interpolation need not be read, thereby to shorten the time consumed by the section reconstructing computations.

Preferably, the reconstruction area is an enlarged reconstruction area divided to have a pixel density higher than a detector pixel density at the center of revolution. The enlarged reconstruction area correspondingly increases the number of back projection points in each unit area. However, radiographic data handled, or part of the radiographic data corresponding to each unit area do not increase but remain the same. These data are used for back projection to the increased number of back projection points also. Thus, the high caching effect is maintained to perform the reconstruction computations fast.

In another aspect of this invention, a radiographic apparatus is provided for generating two-dimensional or three-dimensional reconstruction images of a region of interest by using reconstruction software to perform back projection computations, wherein the reconstruction software comprises the step of causing the back projection computations to be performed, for each unit area formed by dividing the reconstruction area, for projecting the radiographic data acquired in each scan position, or data resulting from filtering of the radiographic data, back to a two-dimensional or three-dimensional section reconstructing area virtually set to a region of interest of the object, the radiographic data being acquired by causing a radiation source and a detector arranged opposite each other across the object to scan the object synchronously, or to scan the object synchronously with rotation of the object, the radiation source irradiating the object with electromagnetic waves capable of penetrating the object, the detector detecting electromagnetic waves transmitted through the object.

According to this invention, the back projection computations are performed by using the above reconstruction software, to reconstruct two-dimensional or three-dimensional images of the region of interest. Thus, back projection computations (reconstruction computations) may be performed for each unit area, that is successively for one unit area after another in a way optimal to cache size. The data in the cache memory are reused at an increased rate, and access to data in the memory is reduced to shorten a total data transfer time and a time consumed by the section reconstructing computations, thereby performing the section reconstructing computations at high speed.

In a further aspect of the invention, there is provided a storage medium recording reconstructing software and readable by a computer, wherein the reconstruction software comprises the step of causing the back projection computations to be performed, for each unit area formed by dividing the section reconstructing area, for projecting the radiographic data acquired in each scan position, or data resulting from filtering of the radiographic data, back to a two-dimensional or three-dimensional reconstruction area virtually set to a region of interest of the object, the radiographic data being acquired by causing a radiation source and a detector arranged opposite each other across the object to scan the object synchronously, or to scan the object synchronously with rotation of the object, the radiation source irradiating the object with electromagnetic waves capable of penetrating the object, the detector detecting electromagnetic waves transmitted through the object.

According to this invention, the reconstruction software may be loaded from the recording medium into the arithmetic processing unit of a computer, the processing unit can perform the reconstruction computations at high speed. Thus, the reconstructing software with the high-speed features may be supplied with an increased degree of freedom.

BRIEF DESCRIPTION OF THE DRAWINGS

For the purpose of illustrating the invention, there are shown in the drawings several forms which are presently preferred, it being understood, however, that the invention is not limited to the precise arrangement and instrumentalities shown.

DESCRIPTION OF THE PREFERRED EMBODIMENTS

Preferred embodiments of this invention will be described in detail hereinafter with reference to the drawings.

<First Embodiment>

Figure 5:
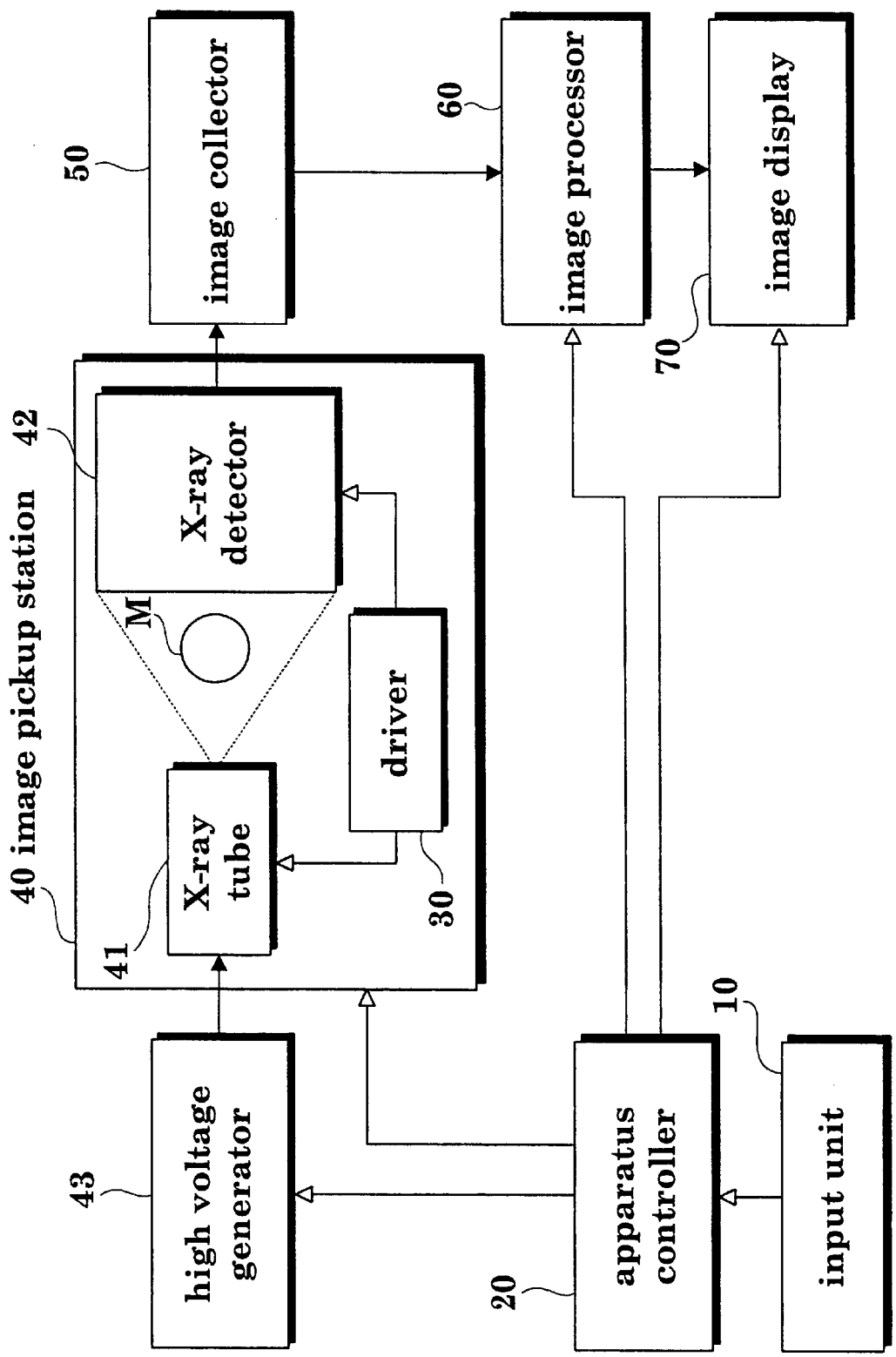
FIG. 5 is a block diagram of an X-ray radiographic apparatus in a first embodiment of this invention.

FIG. 5 is a block diagram of an X-ray radiographic apparatus in a first embodiment, which is one example of radiographic apparatus according to this invention. This X-ray radiographic apparatus includes an input unit 10 for inputting various information and instructions, an apparatus controller 20 for controlling the entire apparatus such as its X-ray radiographic operation based on the information and instructions inputted, a driver 30 for operating an image pickup station 40 under control of the apparatus controller 20, the image pickup station 40 for acquiring images of a region of interest of an object M, an image collector 50 for collecting image information acquired by the image pickup station 40, an image processor 60 in the form of a computer for performing a predetermined image processing such as an image reconstruction to generate and store sectional images of the region of interest of object M from image information provided by the image collector 50, and an image display 70 for displaying image information processed by the image processor 60. The image pickup station 40 includes an X-ray tube 41 for irradiating the object M with X rays, and an X-ray detector 42 for detecting X rays transmitted through the object M. The X-ray tube 41 is supplied with a necessary source voltage such as a tube current or tube voltage by a high voltage generator 43. With a collimator and a slit provided, the X-ray tube 41 irradiates the object M with X rays in a fan beam or cone beam.

The apparatus controller 20, which controls the entire radiographic apparatus, is in the form of dedicated hardware, workstation or personal computer storing apparatus controlling software, for example. The input unit 10 (e.g. a keyboard, mouse or buttons) connected to the apparatus controller 20 is operable by a user to collect and display various X-ray data. For example, the X-ray tube 41 and high voltage generator 43 are controlled to generate X rays, and at the same time X rays transmitted through the object M are converted into electric signals by the X-ray detector 42. Thereafter, the image collector 50 performs an AD (analog-to-digital) conversion of the electric signals to produce X-ray transmission data. The image processor 60 performs the predetermined image processing on the X-ray transmission data, and then displays the data on the image display 70 (e.g. CRT or liquid crystal display) as appropriate. In time of radiography, the object M is scanned, while the X-ray tube 41 and X-ray detector 42, or the object M, are/is moved mechanically to acquire numerous desired X-ray transmission data. It is the image pickup station 40 that determines features in outward appearance of the radiographic apparatus for two-dimensional CT (Computed Tomography) or three-dimensional CT. The image pickup station 40 has a mechanical construction variable with a reconstruction method. Reconstruction computations according to this reconstruction method are often performed as part of the functions of the image processor 60 in the form of dedicated hardware such as a DSP (digital signal processor). Such computations may be implemented also by a PC using this invention.

Figure 6A:
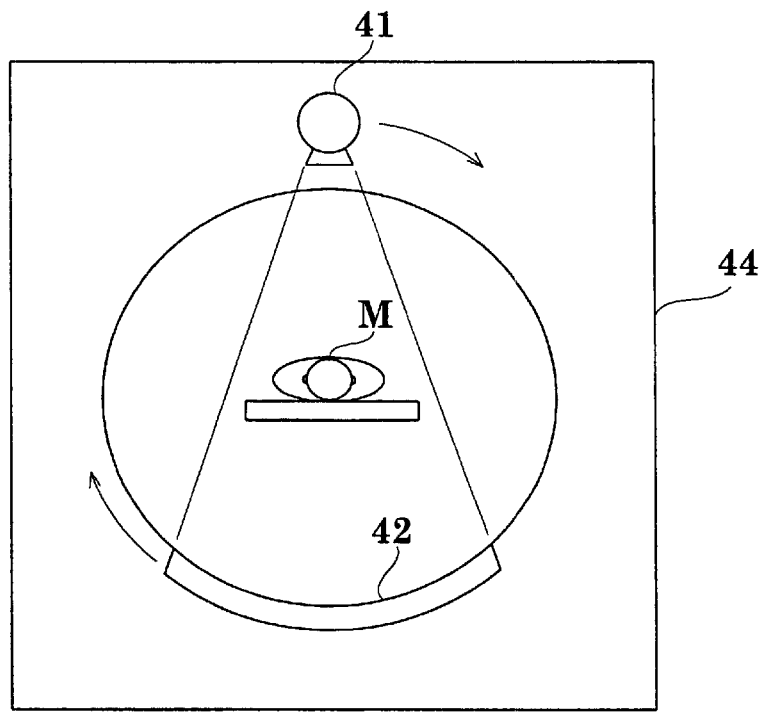
FIG. 6A is a schematic view of one example of image pickup station of the X-ray radiographic apparatus.
Figure 6B:
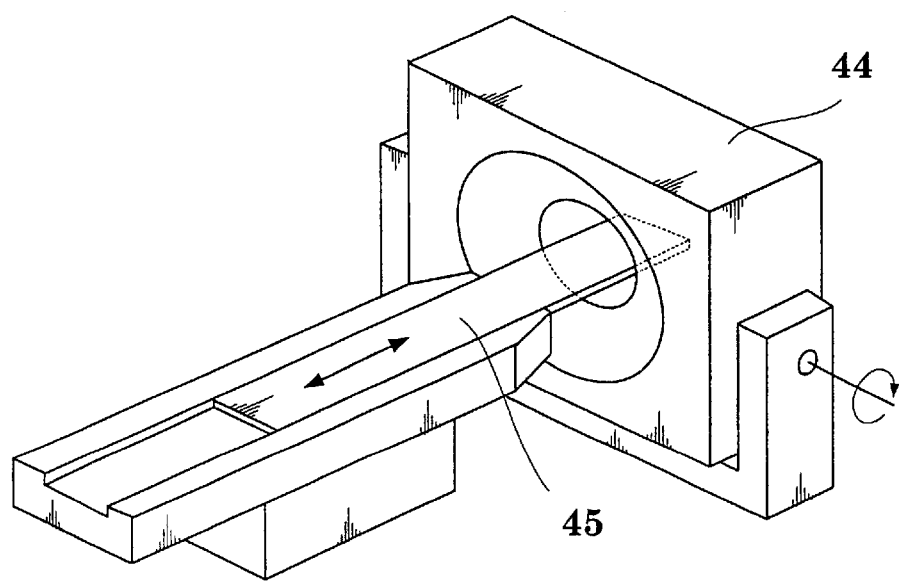
FIG. 6B is a schematic perspective view showing an outward appearance of the image pickup station shown in FIG. 6A.

An X-ray CT apparatus for medical use will be described as an X-ray radiographic apparatus implementing the image pickup station 40. This X-ray CT apparatus for medical use basically has the construction of the above X-ray radiographic apparatus. In particular, the image pickup station 40 is constructed as shown in FIG. 6. FIG. 6A is a schematic view of one example of image pickup station of the X-ray radiographic apparatus. FIG. 6B is a schematic perspective view showing an outward appearance of the image pickup station shown in FIG. 6A.

The X-ray tube 41 and X-ray detector 42 arranged in a gantry 44 are opposed to each other to be revolvable together about the body axis (perpendicular to the plane of FIG. 6A) of a patient M placed on a top board 45. The X-ray tube 41 corresponds to the radiation source of this invention. The X-ray detector 42 corresponds to the detector of this invention.

In time of radiography by this apparatus, the input unit 10 is operated to determine, before picking up images of the region of interest of patient M, the number of views indicating how many times radiography should be performed while revolving the X-ray tube 41 and X-ray detector 42. Assuming that the number of views is 1800, radiography is performed to accumulate in the image processor 60 X-ray transmission data acquired in scan positions (i.e. projection positions) at intervals of 0.2 degrees of a full 360-degree revolution (=360 degrees/1800).

Figure 7A:
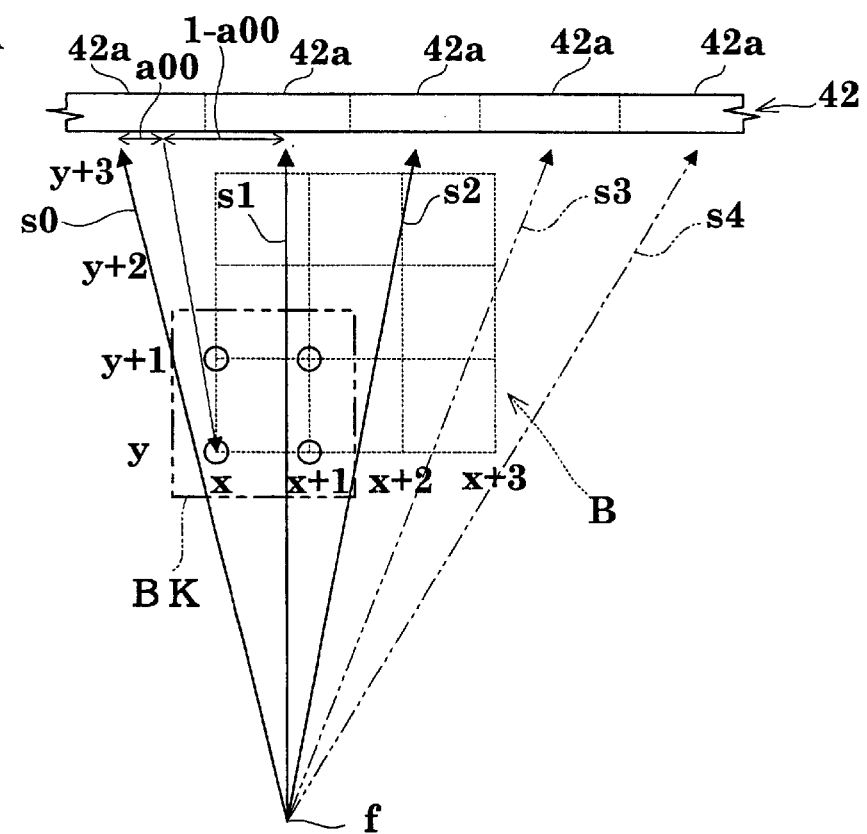
FIGS. 7A and 7B are schematic views illustrating a back projection of radiographic data to a two-dimensional reconstruction area by reconstruction software in the first embodiment.

In time of reconstruction by this apparatus, the radiographic data corresponding to 1800 times accumulated in the image processor 60 are subjected to various correction processes, and then to a filtering process. The image processor 60 performs a reconstruction process using the filtered data as back projection data S. That is, a sectional image is obtained by projecting the back projection data S to a two-dimensional reconstruction area B set to the region of interest on a section intersecting the body axis of patient M. The back projection is made at intervals of 0.2 degrees that are equal to the projection angles in time of data collection. A reconstruction image is completed by performing the back projection 1800 times. FIG. 7A shows a relationship between projection and back projection for one of the 1800 times projections in the above example. A straight line linking an X-ray focus f of X-ray tube 41 and the center of each X-ray detecting element 42*a* of X-ray detector 42 represents a course of an X ray emitted from the X-ray focus f, transmitted through the patient M in the reconstruction area B, and detected as X-ray projection data at the center of X-ray detecting element 42*a* of X-ray detector 42. Each arrow indicates a direction of projection. The direction opposite to the direction indicated by each arrow is a direction of back projection. Back projection is effected in the direction from the center of each X-ray detecting element 42*a* to the X-ray focus f. In the following description, the back projection data S projected along these straight lines will be called back projection data s0, s1, s2, s3 and so on corresponding to the X-ray detecting elements 42*a*.

Figure 7B:
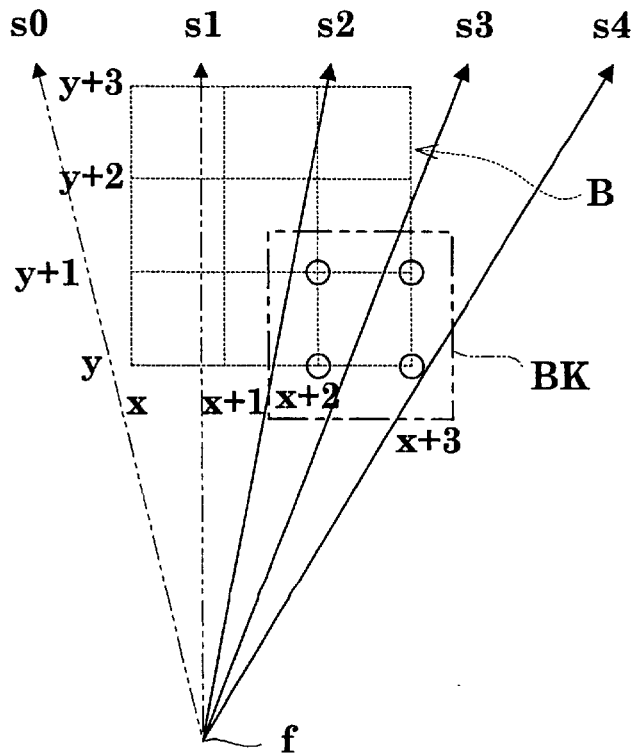
Figures 8A, 8B:
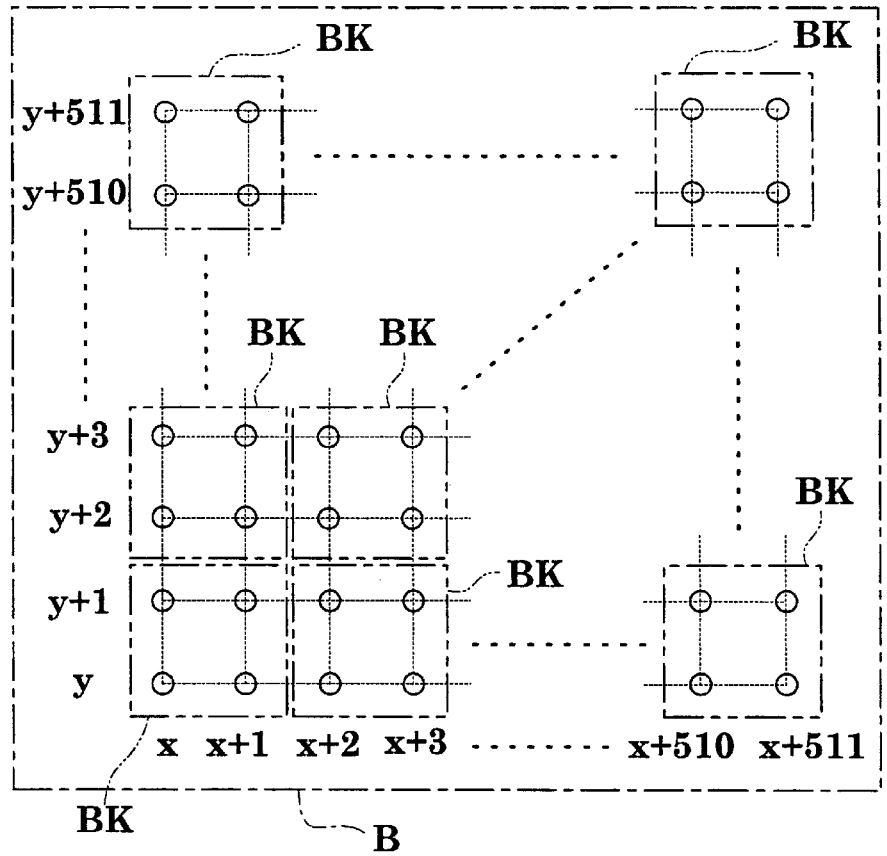
FIG. 8A is a schematic view of the two-dimensional reconstruction area.
FIG. 8B is a program code showing a principal portion of the reconstruction software in the first embodiment.

FIG. 8A shows an example where the invention of claims 1 and 2 is applied to a two-dimensional reconstruction area B of 512 (in a direction along X-axis) by 512 (in a direction of Y-axis). Back projection points indicated by circles in the drawings are all divided into square blocks BK of 2×2. Back projection computations are performed for each block BK. Specifically, as shown in FIG. 7A, one block BK includes back projection points b(x, y), b(x+1, y), b(x, y+1) and b(x+1,y+1) in the two-dimensional reconstruction area B. After performing back projection computations for this block BK, a shift is made to a next block BK adjacent this block BK (e.g. the block, as shown in FIG. 7B, including back projection points b(x+2, y), b(x+3, y), b(x+2, y+1) and b(x+3, y+1) in the two-dimensional reconstruction area B), and back projection computations are performed for this block BK. A further shift is made to a next block BK and back projection computations are performed therefor. This shifting process is repeated.

Reconstructing software corresponding to claim 1 hereof may be expressed by a program code as shown in FIG. 8B. An operation for performing back projection computations for each block BK will be described by using computational expressions. Back projection computations are performed for the block BK including back projection points b(x, y), b(x+1, y), b(x, y+1) and b(x+1, y+1) in the two-dimensional reconstruction area B as shown in FIG. 7A. Reconstruction computations are performed successively for the back projection points (four points) in the block BK in the following order:

$$b(x, y)=b(x, y)+(1-a00)*s0+a00*s1 \quad (4)$$

$$b(x+1, y)=b(x+1, y)+(1-a10)*s1+a10*s2 \quad (5)$$

$$b(x, y+1)=b(x, y+1)+(1-a00)*s0+a00*s1 \quad (6)$$

$$b(x+1, y+1)=b(x+1, y+1)+(1-a10)*s1+a10*s2 \quad (7)$$

The CPU first computes the equation (4) after each data therein is read from the memory into the cache memory. Thus, data s1 in the second equation (5), which is in the first equation (4) also, is read from the cache memory. The data in the above equations (4)–(7) read from the cache memory are data s1 in equation (5), data s0 and s1 in equation (6), and data s1 and s2 in equation (7). Thus, five data per block are read from the cache memory, to realize a fast computing operation. Actually, data b (x, y) at the left of equation (4), data b(x+1, y) at the left of equation (5), data b(x, y+1) at the left of equation (6) and data b(x+1, y+1) at the left of equation (7) also are cached. These data are not read again, but have to be written to the memory eventually as computation results. A provisional estimate is made for a data access time by assuming that these data are not cached.

Data s0 to s2 necessary for a back projection to the block BK in FIG. 7A are shown in solid lines, and unnecessary data s3 and s4 in two-dot chain lines. Data s2 to s4 necessary for a back projection to the block BK in FIG. 7B are shown in solid lines, and unnecessary data s0 and s1 in two-dot chain lines. It is important that the number of back projection data necessary for the computations is reduced by performing a reconstruction on a block-by-block basis as shown in FIGS. 7A and 7B.

Figure 1:
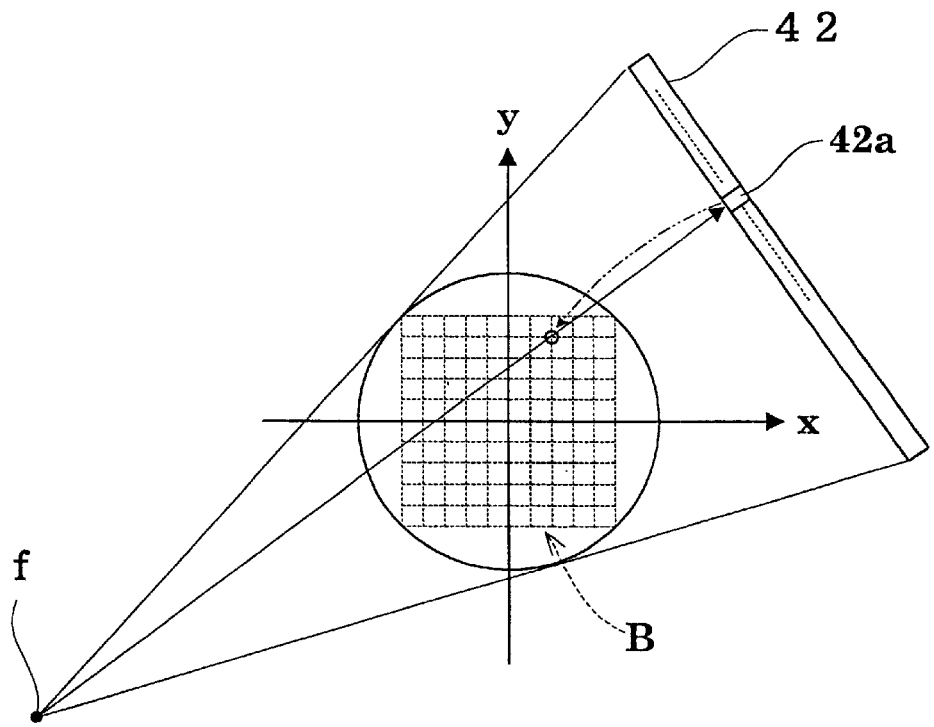
FIG. 1 is a schematic view illustrating a back projection to a reconstruction area.
Figure 2:
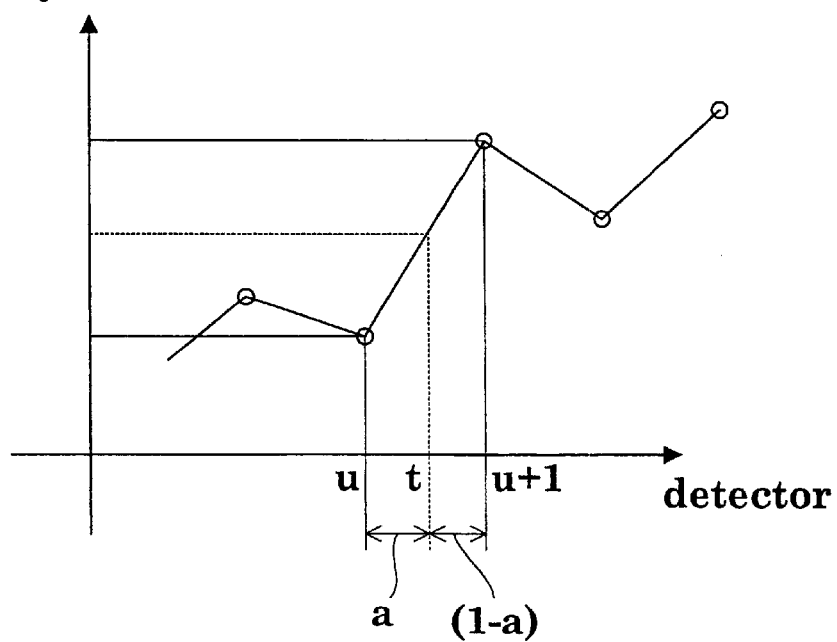
FIG. 2 is an explanatory view illustrating an interpolation for data detected by an X-ray detector.
Figures 3, 4:
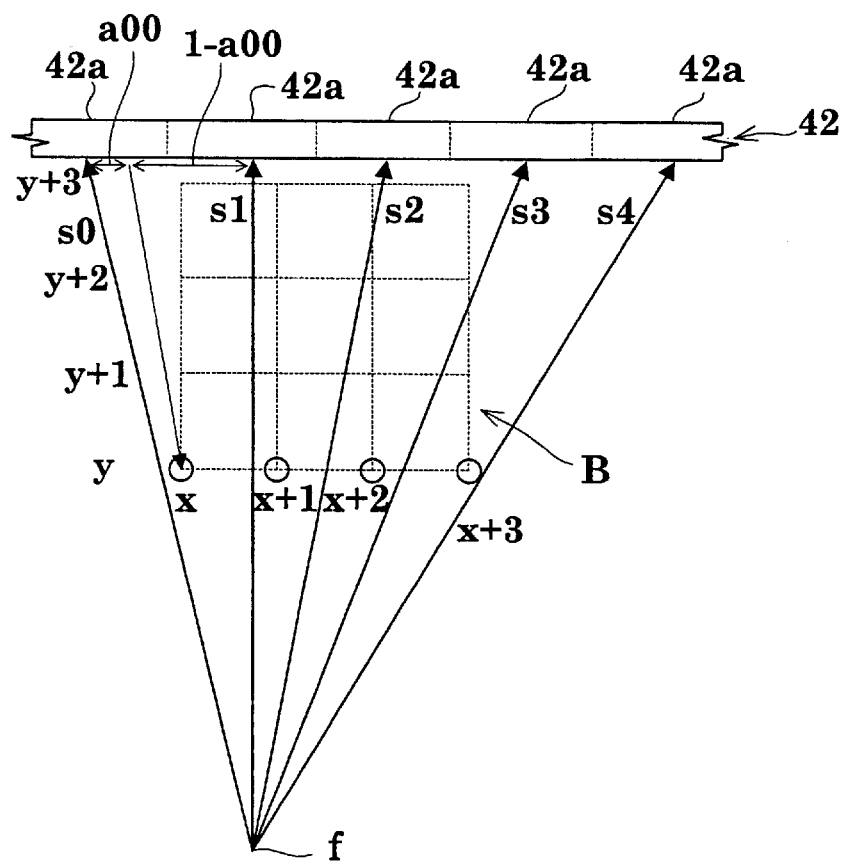
FIG. 3 is a program code showing a principal portion of conventional reconstruction software.
FIG. 4 is a schematic view illustrating a back projection of radiographic data to a two-dimensional reconstruction area in the prior art.

In the data accessing, data b is read four times and written four times. Data s is read eight times, of which the same data is read five times from the cache memory. Thus, the data access time by the CPU of the PC in this example is determined as follows:

data access time=5 nsec/float×8 times+5 nsec/float×(8 times−5 times)+1.25 nsec/float×5 times=61.25 nsec In the prior art, as shown in FIG. 4, back projection computations are first performed for one row in the direction along x-axis (e.g. back projection points b(x, y) to b(x+511, y)) in the reconstruction area B. Then, a shift is made by one row in the direction along y-axis, and back projection computations are performed for the next row in the direction along x-axis (e.g. back projection points b(x, y+1) to b (x+511, y+1)). In this way, back projection computations are performed successively for one row after another. Back projection computations for four back projection points are as follows:

$$b(x, y)=b(x, y)+(1-a00)*s0+a00*s1 \quad (8)$$

$$b(x+1, y)=b(x+1, y)+(1-a10)*s1+a10*s2 \quad (9)$$

$$b(x+2, y)=b(x+2, y)+(1-a20)*s2+a20*s3 \quad (10)$$

$$b(x+3, y)=b(x+3, y)+(1-a30)*s3+a30*s4 \quad (11)$$

Data s1 in equation (9), data s2 in equation (10) and data s3 in equation (11) are thought to be in the cache memory. Actually, data b(x, y) at the left of equation (8), data b (x+1, y) at the left of equation (9), data b(x+2, y) at the left of equation (10) and data b(x+3, y) at the left of equation (11) also are cached. These data are not read again, but have to be written to the memory as computation results. A provisional estimate is made for a data access time by assuming that these data are not cached.

In the data accessing, data b is read four times, and written four times. Data s is read eight times, of which the same data is read three times from the cache memory. Thus, the data access time is determined as follows:

data access time=5 nsec/float×8 times+5 nsec/float×(8 times−3 times)+1.25 nsec/float×3 times=68.75 nsec.

From the estimate results of the data access time in the above first embodiment and the prior art, it will be appreciated that the first embodiment realizes access 68.75/61.25= 1.12 times as fast as access in the prior art.

Generally, a total access time for a reconstruction time of n×n points in the order of computation in the prior art is: Told=5×(2×n×n)+5×(n×n+1)+1.25 (2×n×n−(n×n×1)). On the other hand, a total access time for a reconstruction time of n×n points based on the square blocks in the first embodiment is: T1=5×(2×n×n)+5×(n+1)+1.25(2×n×n−(n+ 1)). This ratio is 1.12 to 1.30 within the range of n=2 to 256, to indicate a speed-up effect. The blocks BK, because of the square shape, are not easily affected by the direction of back projection. That is, when the blocks BK are seen from each scan position, their shape does not change conspicuously. This provides a feature that the number of data such as s0 to s2 used in the computations is substantially fixed, and hence a fixed computation time.

In the first embodiment described above, radiographic data acquired in each scan position is filtered and then proected back to a two-dimensional reconstruction area B virtually set to a region of interest of patient M. Reconstruction software is used for causing the image processor 60 to perform reconstruction computations for each block BK serving as a unit area formed by dividing the reconstruction area B. The back projection computations (reconstruction computations) are performed successively for one block BK after another in a way optimal to cache size. The data in the cache memory are reused at an increased rate, and access to data in the memory is reduced to shorten a total data transfer time and a time consumed by the reconstruction computations.

As set forth in claim 6, the data are successively projected back to one block BK and then to an adjacent block BK. Thus, the data in the cache memory are reused at a further increased rate to shorten the time consumed by the section reconstructing computations.

As set forth in claim 7, the data are projected back to a plurality of back projection points in each block BK, successively to one back projection point and then to an adjacent back projection point. In this way, the reconstruction computations may be performed in an optimal order. The high rate of reusing the data in the cache memory is secured to shorten the time consumed by the reconstruction computations.

The radiographic apparatus in the first embodiment performs the back projection computations by using the above reconstruction software to generate a two-dimensional reconstruction image of a region of interest. Thus, back projection computations (reconstruction computations) may be performed for each block BK serving as a unit area, that is successively for one block BK after another in a way optimal to cache size. The data in the cache memory are reused at an increased rate, and access to data in the memory is reduced to shorten a total data transfer time and the time consumed by the reconstruction computations. Thus, the radiographic apparatus in the first embodiment can perform the reconstruction computations at high speed.

<Second Embodiment>

An X-ray CT apparatus in the second embodiment of this invention relating to claim 3 will be described next. The X-ray CT apparatus in the second embodiment is the same as the foregoing apparatus in the first embodiment except the reconstruction software stored in the image processor 60. The reconstruction software used in the second embodiment will be described in detail.

With the reconstruction software in the first embodiment described hereinbefore, the reconstruction area B is divided into square blocks BK. With the reconstruction software in the second embodiment, blocks BK are shaped rectangular and elongate in the directions of back projection.

Figure 9A:
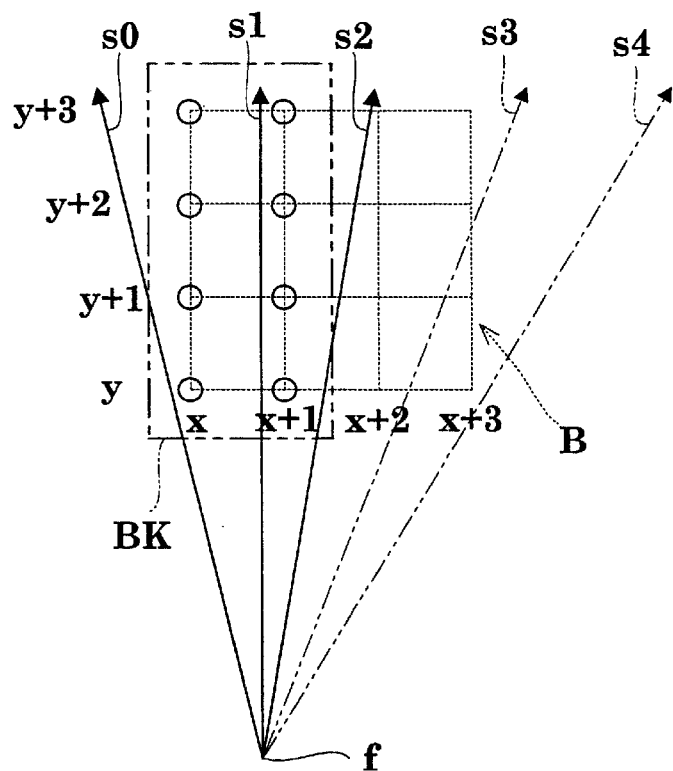
FIGS. 9A and 9B are schematic views illustrating a back projection of radiographic data to a two-dimensional reconstruction area by reconstruction software in a second embodiment.
Figure 9B:
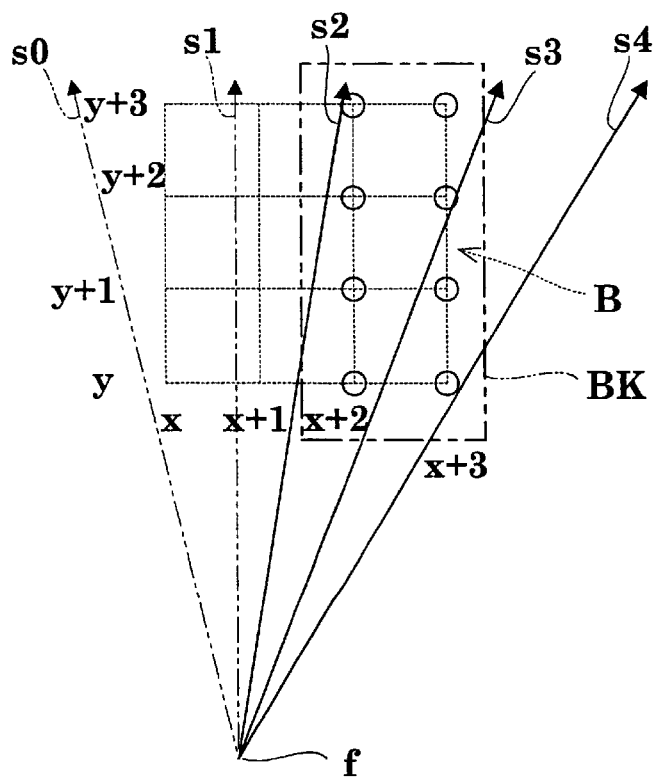

This image processor 60 divides the two-dimensional reconstruction area B into rectangular blocks BK each including 2×4 back projection points indicated by circles in FIGS. 9A and 9B. The image processor 60 performs back projection computations once for each block BK. That is, as shown in FIG. 9A, one block BK in the two-dimensional reconstruction area B includes back projection points b(x, y), b(x+1, y), b(x, y+1), b(x+1, y+1), b(x, y+2), b(x+1, y+2), b(x, y+3), and b(x+1, y+3). After performing back projection computations once for this block BK, a shift is made to a next block BK adjacent this block BK (e.g. the block, as shown in FIG. 9B, including back projection points b(x+2, y), b(x+3, y), b(x+2, y+1), b(x+3, y+1), b(x+2, y+2), b(x+3, y+2), b(x+2, y+3) and b(x+3, y+3) in the two-dimensional reconstruction area B), and back projection computations are performed once for this block BK. A further shift is made to a next block BK and back projection computations are performed therefor. This process is repeated.

Data s0 to s2 necessary for a back projection to the block BK in FIG. 9A are shown in solid lines, and unnecessary data s3 and s4 in two-dot chain lines. Data s2 to s4 necessary for a back projection to the block BK in FIG. 9B are shown in solid lines, and unnecessary data s0 and s1 in two-dot chain lines. It is important that the number of back projection data necessary for the computations is reduced by performing a reconstruction on a block-by-block basis as shown in FIGS. 9A and 9B.

The foregoing first embodiment has been compared with the prior art based on four back projection points. The second embodiment in which each block BK includes eight back projection points will be compared with the prior art and the first embodiment.

In the prior art, data b is read eight times, and written eight times. Data s is read 16 times, of which the same data is read seven times from the cache memory. Thus, the data access time is determined as follows:

data access time=5 nsec/float×16 times+5 nsec/float×(16 times−7 times)+1.25 nsec/float×7 times=133.75 nsec.

In this second embodiment, on the other hand, data b is read eight times, and written eight times. Data s is read 16 times, of which the same data is read 13 times from the cache memory. Thus, the data access time is determined as follows:

data access time=5 nsec/float×16 times+5 nsec/float×(16 times−13 times)+1.25 nsec/float×13 times=111.75 nsec.

From the provisional estimate results of the data access time in the above second embodiment and the prior art, it will be appreciated that the second embodiment realizes access 133.75/111.25=1.2 times as fast as access in the prior art.

Further, in the first embodiment with each square block BK including four back projection points, the data access time is 61.25 nsec. The data access time per point is 61.25 nsec/4=15.31 nsec. In the second embodiment, the data access time per point is 111.25 nsec/8=13.91 nsec. This is 15.31/13.91=1.1 times as fast as access in the first embodiment. Thus, the second embodiment exceeds the first embodiment in speed.

Figures 10, 11:
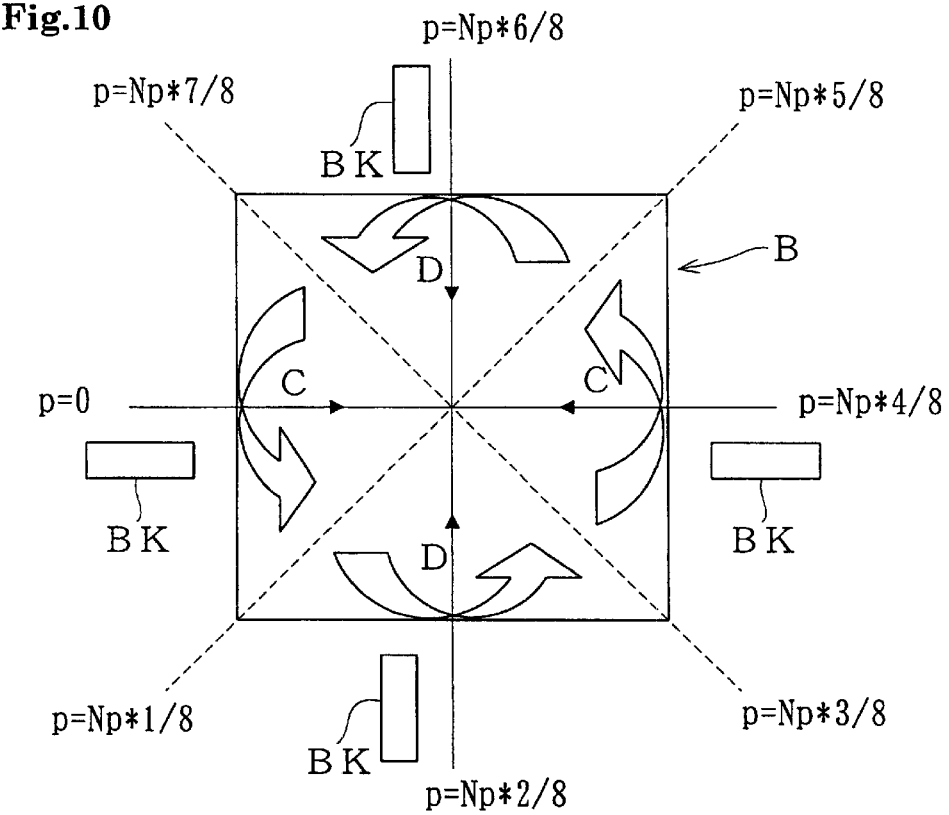
FIG. 10 is a schematic view illustrating rectangular blocks variable with directions of back projection in the second embodiment.
FIG. 11 is a program code showing a principal portion of the reconstruction software in the second embodiment.

The rectangular blocks BK in the second embodiment, if constantly arranged in one direction relative to the two-dimensional reconstruction area B, will be affected by the directions of back projection. That is, when the blocks BK are seen from each scan position, their shape will change remarkably. In FIG. 9A, the back projection is made in the y-direction to block BK only with data s0–s2. When the back projection is made in the x-direction, since the block BK is longer in the y-direction than in the direction of back projection (x-direction), data s0–s4 larger than data s0–s2 will be required. This would require more data accesses to be made to the memory than in the state shown in FIG. 9A. Thus, as shown in FIG. 10, the blocks BK are varied in orientation to be long in the directions of back projection. The second embodiment differs from the first embodiment in this respect also, which corresponds to the feature of claim 3.

In ranges C shown in FIG. 10, i.e. where the scan positions p are in the range of $Np \times \frac{7}{8}$ to $Np \times \frac{1}{8}$ and in the range of $Np \times \frac{3}{8}$ to $Np \times \frac{5}{8}$, the blocks BK are long in the direction of back projection for a scan position p at "0". In ranges D shown in FIG. 10, i.e. where the scan positions p are the range of $Np \times \frac{1}{8}$ to $Np \times \frac{3}{8}$ and in the range of $Np \times \frac{5}{8}$ to $Np \times \frac{7}{8}$, the blocks BK are long in the direction of back projection for a scan position p at "$Np \times \frac{2}{8}$".

The reconstruction software in the second embodiment, as shown in FIG. 11, is arranged to vary the orientation of blocks BK to be long in the directions of back projection. Specifically, the two-dimensional reconstruction area B is divided into rectangular blocks BK including 2×4 back projection points, and back projection computations are performed for each block BK.

In the second embodiment described above, the two-dimensional reconstruction area B is divided into rectangular blocks BK elongated in the directions of back projection. Thus, compared with the prior art and the foregoing first embodiment, the data access time may be shortened to speed up the process. Further, since back projection computations are performed for these blocks BK varied in orientation to be long in the directions of back projection, the blocks BK are not easily affected by the directions of back projection. That is, when the blocks BK are seen from each scan position, their shape does not change conspicuously. This provides a feature that the data such as s0 to s2 used in the computations are substantially fixed, while reducing the time consumed by the reconstruction computations. That is, for each direction of back projection, the data in the cache memory are reused at a fixed rate, and a reduced time is consumed by the reconstruction computations.

<Third Embodiment>

An X-ray CT apparatus in the third embodiment of this invention relating to claim 4 will be described next. The X-ray CT apparatus in the third embodiment is the same as the foregoing apparatus in the first embodiment except the reconstruction software stored in the image processor 60. The reconstruction software used in the third embodiment will be described in detail.

With the reconstruction software in the first embodiment described hereinbefore, back projection computations are performed for one square block BK after another in respect of one scan position, and then a shift is made to a back projection process in respect of a next scan position. With the reconstruction software in the third embodiment, back projection computations are performed for one block BK in respect of a plurality of scan positions (e.g. two scan positions as the most basic example), and then back projection computations are performed for a next block BK in respect of the same number of scan positions. The third embodiment differs from the first embodiment in this respect.

Figure 12:
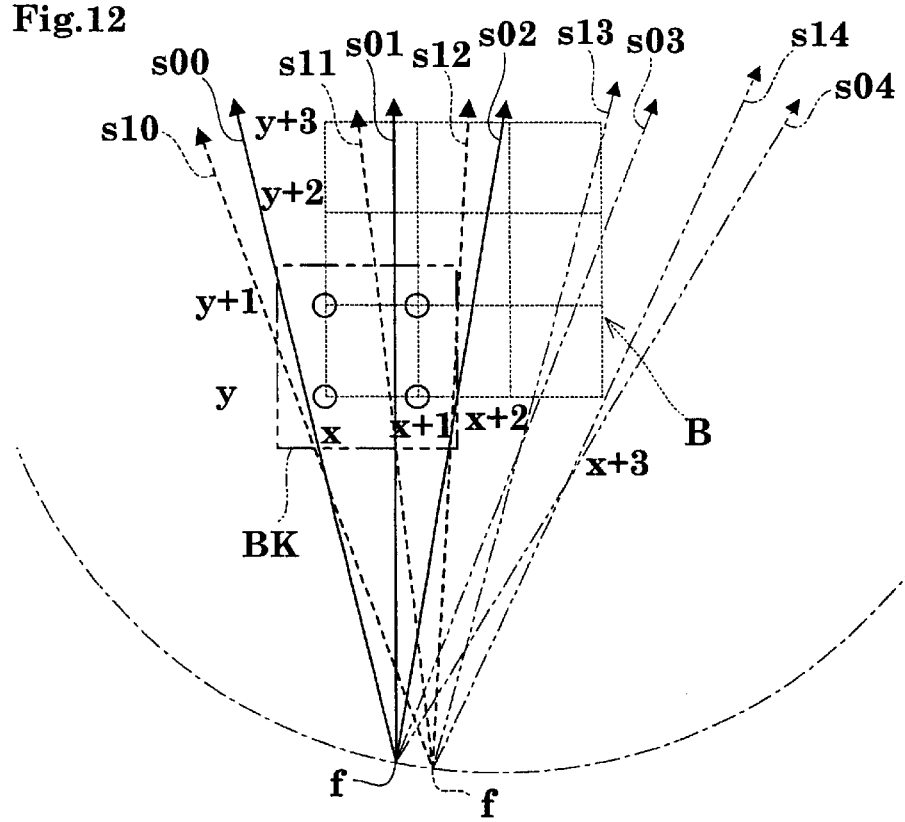
FIG. 12 is a schematic view illustrating a back projection of radiographic data to a two-dimensional reconstruction area by reconstruction software in a third embodiment.

Specifically, as shown in FIG. 12, two back projecting operations corresponding to two scan positions are performed for the same one block BK as in the first embodiment, and then two back projecting operations corresponding to the same two scan positions are performed for a next adjacent block BK. Two back projecting operations are performed similarly for the remaining blocks BK. The two back projecting operations consist of a "first back projection" corresponding to one certain scan position, and a "second back projection" corresponding to a different scan position (e.g. a next scan position adjacent the first-mentioned certain scan position). References s00 to s04 in FIG. 12 denote data for performing the back projecting corresponding to the one certain scan position, i.e. data for the first back projection. References s10 to s14 denote data for performing the back projection corresponding to the next scan position adjacent the first-mentioned certain scan position, i.e. data for the second back projection.

As seen from FIG. 12, the back projection computations for the block BK shown in FIG. 12 need data s00 to s02 (shown in solid lines in FIG. 12) for the first back projection, and data s10 to s12 (shown in broken lines in FIG. 12) for the second back projection. Data s03, s04, s13 and s14, shown in two-dot chain lines, are unnecessary for the block BK shown in FIG. 12. The data s00 to s02 detected by the X-ray detecting elements 42a are subjected to an interpolation process, and projected back to this block BK (in the first back projection). The data s10 to s12 detected by the X-ray detecting elements 42a are subjected to an interpolation process, and projected back to the same block BK (in the second back projection).

Reconstruction computations according to the reconstruction software in the third embodiment are performed in the order of equations (12) to (19) as set out below. The computations for the first back projection are based on equations (12) to (15). The computations for the second back projection are based on equations (16) to (19).

$$b(x, y)=b(x, y)+(1-a00)*s00+a00*s01 \quad (12)$$

$$b(x+1, y)=b(x+1, y)+(1-a10)*s01+a10*s02 \quad (13)$$

$$b(x, y+1)=b(x, y+1)+(1-a00)*s00+a00*s01 \quad (14)$$

$$b(x+1, y+1)=b(x+1, y+1)+(1-a10)*s01+a10*s02 \quad (15)$$

$$b(x, y)=b(x, y)+(1-a00)*s10+a00*s11 \quad (16)$$

$$b(x+1, y)=b(x+1, y)+(1-a10)*s11+a10*s12 \quad (17)$$

$$b(x, y+1)=b(x, y+1)+(1-a00)*s10+a00*s11 \quad (18)$$

$$b(x+1, y+1)=b(x+1, y+1)+(1-a10)*s11+a10*s12 \quad (19)$$

Data s01 in equation (13), data s00 and s01 in equation (14), data s01 and s02 in equation (15), data s11 in equation (17), data s10 and s11 in equation (18), and data s11 and s12 in equation (19) are read from the cache memory. In the first and second embodiments, parts of data b are not cached. In the third embodiment, data b are needed continuously, and some of data b are written to and read from the cache. Data b(x, y) at the left of equation (12), data b(x+1, y) at the left of equation (13), data b(x, y+1) at the left of equation (14), data b(x+1, y+1) at the left of equation (15), data b(x, y) at the right of equation (16), data b(x+1, y) at the right of equation (17), data b(x, y+1) at the right of equation (18) and data b(x+1, y+1) at the right of equation (19) are in the cache memory for fast accessing.

Data b(x, y) at the left of equation (16), data b(x+1, y) at the left of equation (17), data b(x, y+1) at the left of equation (18) and data b(x+1, y+1) at the left of equation (19) also are cached. These data have to be written to the memory eventually as computation results, and are therefore assumed not to be cached.

In the data accessing in the third embodiment, data b is read eight times, of which the same data is read four times from the cache memory. Data b is written eight times of which the same data read from the cache memory is written four times. Data s is read 16 times of which the same data is read ten times from the cache memory. Thus, the data access time is determined as follows:

data access time=5 nsec/floatx(four times+four times)+ 1.25 nsec/floatx(four times+four times)+5 nsec/ floatx(16 times−10 times)+1.25 nsec/floatx10 times= 92.5 nsec The above converted into time per point is; data access time=92.5 nsec/4=23.125 nsec.

The time taken by two back projections to four points in the prior art converted into time per point is; data access time=2×68.75 nsec/4=34.375 nsec.

From the provisional estimate results of the data access time in the above third embodiment and the prior art, it will be appreciated that the third embodiment realizes access 34.375/23.125=1.5 times as fast as access in the prior art.

Further, the data access time is 61.25 nsec for each square block BK (with four back projection points) in the first embodiment. The data access time for two back projections is; 61.25 nsec×2=122.5 nsec. The third embodiment realizes access 122.5/92.5=1.32 times as fast as access in the first embodiment. Thus, the third embodiment provides a high-speed feature exceeding the first embodiment.

In the third embodiment described above, back projection computations are first performed for one block BK in respect of a plurality of scan positions, and then similar back projection computations are performed for a next block BK. Compared with the prior art and the first embodiment, the data in the cache memory are reused at a further increased rate to shorten the time consumed by the reconstruction computations and realize a high-speed operation.

Preferably, the back projections are carried out successively in the order of scan positions. However, similar advantages may be realized also by successively performing back projections for similar angles such as for every other scan positions. Similar effects may be produced also by successively performing back projections for 180-degree opposite positions or thereabouts.

This invention is not limited to the above embodiments, but may be modified as follows:

(1) In each of the foregoing embodiments, the blocks BK are shaped square or rectangular. As set out in claim 2, the blocks may have other polygonal shapes such as triangular, lozenge-shaped and trapezoidal.

Figure 13:
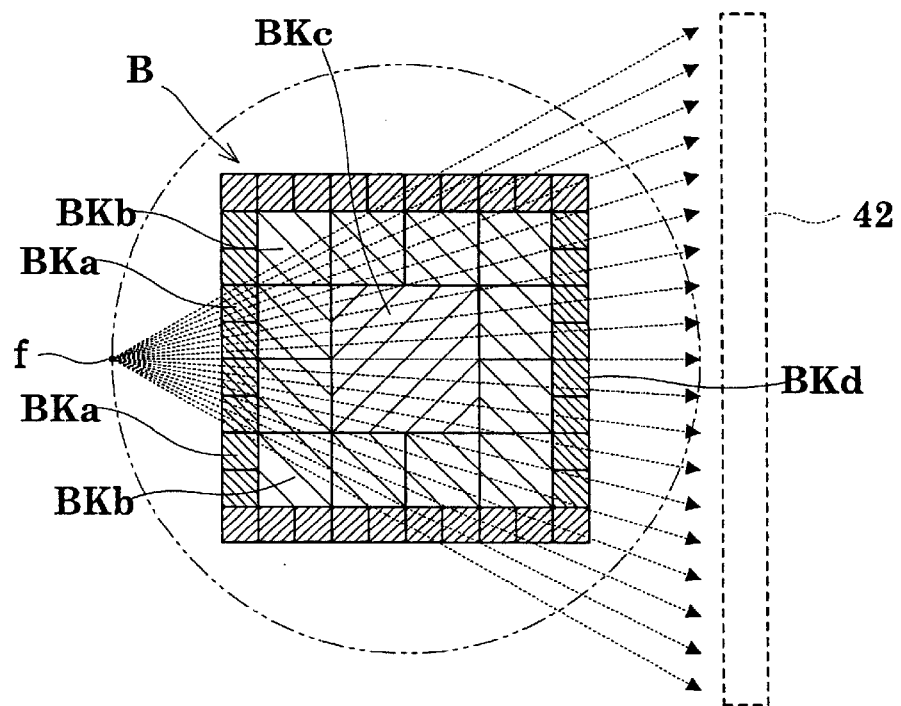
FIG. 13 is a schematic view illustrating a two-dimensional reconstruction area divided into different size central and peripheral blocks.

(2) In the foregoing embodiments, the reconstruction area B is divided into blocks BK all having the same shape. As set out in claim 5, the blocks BK may have different sizes between central parts and peripheral parts of the reconstruction area B. Where, for example, the reconstruction area B is divided into blocks BK of the same size, the radiographic data (original projection data) per block BK necessary for back projection reduce in number (becomes coarse) the farther away from the focal position of X rays. Thus, since variations occur in necessary cache memory size, the time taken by back projection computations is variable with positions of the blocks BK. As shown in FIG. 13, a reconstruction area B of a two-dimension fan beam may be divided into blocks BKa–BKc of different sizes for back projection, varying from peripheries toward the center, such as blocks BKa of size 1×1, blocks BKb of size 2×2, and a block BKc of size 4×4 including the center of revolution. Considering that the center of revolution coincides with the center of the reconstruction area B, the block size may be in inverse proportion to the square of a distance from the center of revolution center, or in inverse proportion to the distance. While FIG. 13 shows square blocks of different sizes, the blocks may be different both in shape and size. This will suppress variations in the time taken by back projection computations due to variations in necessary cache memory size occurring with positions of the blocks in the reconstruction area B. Thus, the reconstruction time may be shortened substantially fixedly irrespective of the positions of the blocks.

Figure 14:
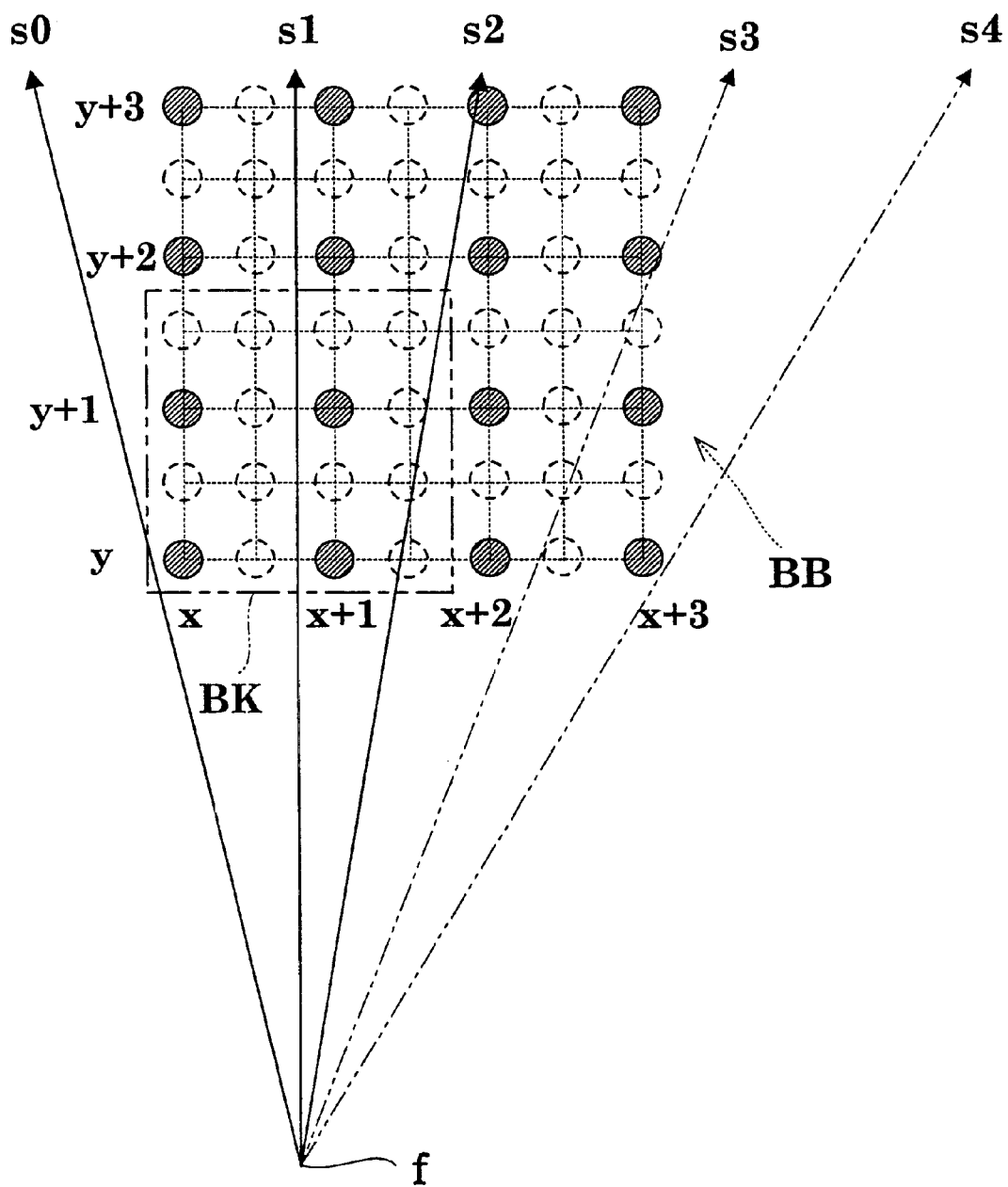
FIG. 14 is a schematic view illustrating a back projection to an enlarged reconstruction area.

(3) Each of the foregoing embodiments employs a "real-size reconstruction" in which the pitch of reconstruction points equals the pitch of detector pixels at the center of revolution (=1/pixel density) corresponding to the pitch of X-ray detecting elements 42a of X-ray detector 42 divided by a geometric magnification (=distance from the focus of X-ray tube 41 to the X-ray detectors 42/distance from the focus of X-ray tube 41 to the center of revolution). As opposed to the above, an "enlarged reconstruction" may be employed, in which the reconstruction area B with n×n back projection points is made into an enlarged section reconstruction area BB with (m×n)×(m×n) back projection points, by multiplying the number of points in the section reconstructing area B by m×m. FIG. 14 is a schematic view showing an example of enlarged reconstruction area BB with 2n×2n back projection points formed by multiplying the reconstruction area B with n×n back projection points by 2×2. As shown in FIG. 14, hatched circles represent the original back projection points, i.e. the above n×n back projection points in the reconstruction area B. Broken line circles represent back projection points added to form the enlarged reconstruction area BB. The area enclosed in the two-dot chain line is a unit block BK. Though the number of back projection points in the unit block BK is increased from four points to 16 points, projection data s remains the same and only data s0 to s2 are used for back projection. Thus, a high caching effect is maintained to perform reconstruction computations at high speed. This points to the validity of claim 9.

(4) In each of the foregoing embodiments, the radiographic data is interpolated after a filtering process, for performing the back projection computations for projection back to the blocks BK in the reconstruction area B. As set out in claim 8, back projection computations may be performed for projecting the radiographic data after the filtering process, without interpolation, back to the blocks BK. In this case, interpolating data need not be read and interpolating computations may be omitted to realize a high-speed processing. Moreover, the reconstruction area may be divided into blocks of increased size corresponding to the decreased amount of data read, to perform reconstruction computations at high speed.

(5) In the foregoing embodiments, the image pickup station 40 includes an X-ray tube 41 for irradiating the object or patient M with X rays in a fan beam, and a one-dimensional X-ray detector 42. The image pickup station 40 may include the X-ray tube 41 for irradiating the object M with X rays in a fan beam, and a varied two-dimensional area detector such as an image intensifier or flat panel X-ray detector revolvable synchronously with the X-ray tube 41. Reconstruction software may be adapted to project radiographic data (two-dimensional X-ray transmission data) acquired in each scan position back to a three-dimensional reconstruction area virtually set to a region of interest of object M radiographed. The three-dimensional reconstruction area may be divided into unit areas (three-dimensional blocks), and back projection computations may be performed for each unit area to realize a fast three-dimensional image reconstruction. The reason is the same as for each embodiment relating to the two-dimensional image reconstruction. The three-dimensional blocks may have a cubic, rectangular parallelepiped, trigonal pyramid, circular cone or other solid shape. In this way, the back projection computations (three-dimensional reconstruction computations) may be performed at high speed for projecting the data back to the three-dimensional reconstruction area.

(6) In each of the foregoing embodiments, one back projection data for one block BK is read, computed and written, and then a next back projection data for the same block BK is similarly read, computed and written. Instead, on a block-by-block basis, all back projection data for each block may be read en bloc (reading step), then these data may be computed en bloc (computation step), and thereafter the computed data are written en bloc (writing step). This process provides effects similar to the foregoing embodiments.

(7) The reconstruction software and radiographic apparatus in the foregoing embodiments are applicable to a medical CT apparatus for treating human patients M, or a radiographic apparatus for causing an X-ray tube and a X-ray detector to scan an object M synchronously (e.g. in a linear parallel movement) to project a given point of the object M constantly to a predetermined point on the X-ray detector. The reconstruction software and radiographic apparatus are applicable also to a nondestructive inspecting apparatus for inspecting printed circuits and various other electronic devices.

(8) In the foregoing embodiments, the X-ray tube irradiates the object M with X rays. The invention is not limited to the use of X rays. Electromagnetic waves penetrating the object M, such as gamma rays, light and electron beams may also be used to produce similar effects. Thus, the radiographic apparatus according to this invention is not limited to X-ray radiographic apparatus, but is applicable also to radiographic apparatus for performing radiography by using electromagnetic waves, other than X rays, penetrating the object M.

(9) In the foregoing embodiments, data resulting from a filtering process of radiographic data acquired in each scan position is subjected to back projection computations for projection back to a section reconstructing area. The invention is applicable also to back projection computations for projecting the radiographic data acquired in each scan position back to the reconstruction area without filtering the data.

(10) In the foregoing embodiments, images are reconstructed from radiographic data covering 360 degrees around the body axis of the object. The invention is applicable to back projection in general, including a reconstruction based on radiographic data for less than 360 degrees.

(11) The reconstruction software as set out in any one of claims 1 to 18 may be recorded on recording media (various recording media such as magnetic disks and magnet-optical disks) readable by computers. By loading the software from such a recording medium into the arithmetic processing unit of a computer, the processing unit can perform reconstruction computations at high speed. Thus, the reconstruction software with the high-speed features may be supplied with an increased degree of freedom.

The present invention may be embodied in other specific forms without departing from the spirit or essential attributes thereof and, accordingly, reference should be made to the appended claims, rather than to the foregoing specification, as indicating the scope of the invention.

What is claimed is:

1. Reconstructing software for performing back projection computations to project radiographic data of an object acquired in each scan position back to a reconstruction area, said software comprising the step of:

causing the back projection computations to be performed, for each unit area formed by dividing said reconstruction area, for projecting said radiographic data acquired in each scan position, or data resulting from filtering of said radiographic data, back to a two-dimensional or three-dimensional reconstruction area virtually set to a region of interest of said object, said radiographic data being acquired by causing a radiation source and a detector arranged opposite each other across said object to scan said object synchronously, or to scan said object synchronously with rotation of said object, said radiation source irradiating said object with electromagnetic waves capable of penetrating said object, said detector detecting electromagnetic waves transmitted through said object.

2. Reconstruction software as defined in claim 1, wherein each said unit area has a square, rectangular, triangular, lozenge-shaped, trapezoidal or other polygonal shape where the reconstruction area is two-dimensional, and a cubic, rectangular parallelepiped, trigonal pyramid, circular cone or other solid shape where the reconstruction area is three-dimensional.

3. Reconstructing software as defined in claim 1, wherein each said unit area is varied in orientation to be long in a direction of back projection.

4. Reconstruction software as defined in claim 1, wherein the back projection computations are performed for each unit area successively in respect of radiographic data corresponding to a plurality of positions among all scan positions.

5. Reconstruction software as defined in claim 1, wherein said unit areas have different sizes between central parts and peripheral parts of said reconstruction area.

6. Reconstructing software as defined in claim 1, wherein the data are successively projected back first to one unit area and then to an adjacent unit area.

7. Reconstructing software as defined in claim 1, wherein the data are projected back to a plurality of back projection points in said unit area, first to one back projection point and then to an adjacent back projection point.

8. Reconstruction software as defined in claim 1, wherein said radiographic data after a filtering process are projected, without interpolation, back to said unit areas.

9. Reconstructing software as defined in claim 1, wherein said reconstruction area is an enlarged reconstruction area divided to have a pixel density higher than a detector pixel density at the center of revolution.

10. Reconstruction software as defined in claim 2, wherein said unit areas have different sizes between central parts and peripheral parts of said reconstruction area.

11. Reconstruction software as defined in claim 2, wherein the data are successively projected back first to one unit area and then to an adjacent unit area.

12. Reconstruction software as defined in claim 2, wherein the data are projected back to a plurality of back projection points in said unit area, first to one back projection point and then to an adjacent back projection point.

13. Reconstruction software as defined in claim 3, wherein said unit areas have different sizes between central parts and peripheral parts of said reconstruction area.

14. Reconstructiong software as defined in claim 3, wherein the data are successively projected back first to one unit area and then to an adjacent unit area.

15. Reconstruction software as defined in claim 3, wherein the data are projected back to a plurality of back projection points in said unit area, first to one back projection point and then to an adjacent back projection point.

16. Reconstruction software as defined in claim 4, wherein said unit areas have different sizes between central parts and peripheral parts of said reconstruction area.

17. Reconstruction software as defined in claim 4, wherein the data are successively projected back first to one unit area and then to an adjacent unit area.

18. Reconstructing method for performing back projection computations to project radiographic data of an object acquired in each scan position back to a reconstruction area, said method comprising the step of:

causing the back projection computations to be performed, for each unit area formed by dividing said reconstruction area, for projecting said radiographic data acquired in each scan position, or data resulting from filtering of said radiographic data, back to a two-dimensional or three-dimensional reconstruction area virtually set to a region of interest of said object, said radiographic data being acquired by causing a radiation source and a detector arranged opposite each other across said object to scan said object synchronously, or to scan said object synchronously with rotation of said object, said radiation source irradiating said object with electromagnetic waves capable of penetrating said object, said detector detecting electromagnetic waves transmitted through said object.

19. A radiographic apparatus for generating two-dimensional or three-dimensional reconstruction images of a region of interest by using reconstruction software to perform back projection computations, wherein:

said reconstruction software comprises the step of causing the back projection computations to be performed, for each unit area formed by dividing said reconstruction area, for projecting said radiographic data acquired in each scan position, or data resulting from filtering of said radiographic data, back to a two-dimensional or three-dimensional reconstruction area virtually set to a region of interest of said object, said radiographic data being acquired by causing a radiation source and a detector arranged opposite each other across said object to scan said object synchronously, or to scan said object synchronously with rotation of said object, said radiation source irradiating said object with electromagnetic waves capable of penetrating said object, said detector detecting electromagnetic waves transmitted through said object.

20. A storage medium recording section reconstructing software and readable by a computer, wherein:

said reconstruction software comprises the step of causing the back projection computations to be performed, for each unit area formed by dividing said reconstruction area, for projecting said radiographic data acquired in each scan position, or data resulting from filtering of said radiographic data, back to a two-dimensional or three-dimensional reconstruction area virtually set to a region of interest of said object, said radiographic data being acquired by causing a radiation source and a detector arranged opposite each other across said object to scan said object synchronously, or to scan said object synchronously with rotation of said object, said radiation source irradiating said object with electromagnetic waves capable of penetrating said object, said detector detecting electromagnetic waves transmitted through said object.

* * * * *